United States Patent [19]

Nygards

[11] Patent Number: 5,037,510
[45] Date of Patent: Aug. 6, 1991

[54] INTEGRATED WATER DISTILLER AND/OR WATER HEATER AND/OR FURNACE

[76] Inventor: Nils Nygards, 7435 Hwy. 65 NE., Minneapolis, Minn. 55402-3901

[21] Appl. No.: 273,846

[22] Filed: Nov. 21, 1988

[51] Int. Cl.$^5$ .................. B01D 3/02; C02F 1/04
[52] U.S. Cl. .................. 202/83; 202/166;
202/167; 202/176; 202/180; 202/181;
202/185.1; 202/185.5; 202/235; 202/267.1;
202/267.2; 122/33; 126/101; 126/350 B;
126/361; 203/2; 203/10; 203/27; 203/31;
203/86; 203/DIG. 8
[58] Field of Search ............ 202/166, 167, 165, 152,
202/266, 206, 83, 181, 185.1, 163, 185.5, 267.2,
267.1, 180, 176, 233, 234, 235; 203/10, 1, 2,
DIG. 8, 31, 21, 27, 86, DIG.17, DIG. 16;
126/101, 350 B, 113, 361; 210/759; 122/33, 32

[56] References Cited

U.S. PATENT DOCUMENTS

| | | | |
|---|---|---|---|
| 645,790 | 3/1900 | Conover | 202/165 |
| 755,179 | 3/1904 | Smith | 202/267.2 |
| 849,210 | 4/1907 | Daley et al. | 202/166 |
| 1,061,359 | 5/1913 | Daley et al. | 202/166 |
| 3,619,380 | 11/1971 | Stephens | 202/166 |
| 3,705,098 | 12/1972 | Shepherd et al. | 210/759 |
| 4,049,502 | 9/1977 | Nagels | 203/DIG. 8 |
| 4,113,571 | 9/1978 | Nygards | 202/176 |
| 4,136,731 | 1/1979 | DeBoer | 126/101 |
| 4,178,907 | 12/1979 | Sweat | 126/101 |
| 4,257,852 | 3/1981 | Worrell | 203/86 |
| 4,265,712 | 5/1981 | McLean | 202/166 |
| 4,478,685 | 10/1984 | Mortenson | 203/86 |

Primary Examiner—Wilbur Bascomb
Attorney, Agent, or Firm—Faegre & Benson

[57] ABSTRACT

An integrated system provides combined space heating, water heating and water distillation. The system is adapted for supplying combined services to residential and commercial buildings. The system may be used in retrofitting existing space heating furnaces and/or water heaters to provide an energy and cost efficient combined system. A portable water heating/water distilling unit can be used with an existing portable self-contained heater.

25 Claims, 7 Drawing Sheets

INTEGRATED WATER DISTILLER AND/OR WATER HEATER AND/OR FURNACE

1. Field of the Invention.

This invention relates to an integrated system for providing combined space heating, water heating and water distillation. This system is adapted for use in supplying these combined services for residential and commercial buildings. In particular, the present invention provides an energy and cost efficient combined system that may be used as a primary source of distilled water and as an auxiliary source of hot water and space heating in conjunction with existing space heating furnaces and/or water heaters. In addition, an alternative embodiment of this invention provides a portable water heating/water distilling unit for use with an existing portable self-contained gas burner.

BACKGROUND OF THE INVENTION

The conventional methods for providing water heating, water distillation and space heating, particularly for residential use, require three separate appliances performing similar but separate jobs. The use of multiple separate appliances requires an excessive amount of energy, much being lost in unrecovered heat. Even with the introduction of energy efficient individual appliances in recent years, the continued practice of maintaining separately functioning appliances continues to mean wasting large amount of heat and energy. In addition, although manufacturers of space heating furnaces and water heaters continue to try to design more energy efficient and long lasting units, such advances in design often lead to units having prohibitively high initial cost.

In my previous patent, U.S. Pat. No. 4,113,571, issued Sept. 12, 1978, which is incorporated herein by refere disclosed a water distiller of the boiler-condenser type for on-line purification of water. As described therein, the unit consists of a relatively slender boiler with an internal diffuser screen, which functions to transmit heat from an electric heating member to the water, while minimizing water turbulence as distillation proceeds.

I have now developed an integrated system which combines features of my water distillation apparatus with additional water heating and space heating capabilities.

SUMMARY OF THE INVENTION

This invention thus provides an integrated water distilling, water heating and/or space heating system. The water distiller is formed with an elongated water boiler tube. The water in the boiler tube is heated with a gas heating element. Within the boiler tube is a metal heat transmitter in intimate contact with the water to transfer heat rapidly from the heating element to the water and also to minimize water turbulence as distillation proceeds.

The combustion gases from the gas heating element of the boiler tube are connected by an intake plennum to the burner chamber of a conventional gas furnace and/or to the burner chamber of a conventional gas water heater as the source of power to both the water distiller and to the furnace and/or the water heater.

It is to be understood that the original gas burner in the furnace and in the water heater must be deactivated or removed in order to avoid the possibility of explosion. Under most circumstances, the amount of heat provided by the furnace and the amount of hot water provided by the water heater, according to the retrofitted design of the present invention, will generally serve as auxiliary sources of heat and hot water in addition to a pre-existing furnace and hot water heater.

For additional purification of the final distilled water, the water supplied to the boiler may be filtered to remove particulate and may be pretreated with a small amount of hydrogen peroxide sufficient to remove organic impurities therefrom.

Most building codes currently in effect require double walled heat exchangers when domestic water heaters and hot water heating boilers are interconnected. The device according to the present invention avoids that requirement, since the condensing coil taken through the potable water heater contains pure distillate and double-walling is unnecessary.

Thus, a highly important application of the present invention involves conducting the water vapor from the distiller-boiler to the condensing coil inside the potable water heater, while the exhaust gases from the same boiler are conducted into the burner chamber of the other furnace and/or the water heater.

When the steam condensation takes place in the heat exchanger within the air duct of a forced air furnace or inserted into a hot water boiler, that distillate should be used for bathing, cleaning or industrial use, rather than as potable water. Sufficient quantities of potable water will be obtained from the coil inserted into the domestic water heater and that water should be handled and conducted to the point of use by means separate from the distillate used as non-potable water.

BRIEF DESCRIPTION OF THE DRAWINGS

FIG. 9 shows an arrangement for back flushing and cleaning the water distiller tube of the system of this invention.

DETAILED DESCRIPTION OF THE INVENTION

Referring to the drawings, this integrated system includes the following basic components: a water distiller, in conjunction with a water heater or a furnace or both.

Figure 5:
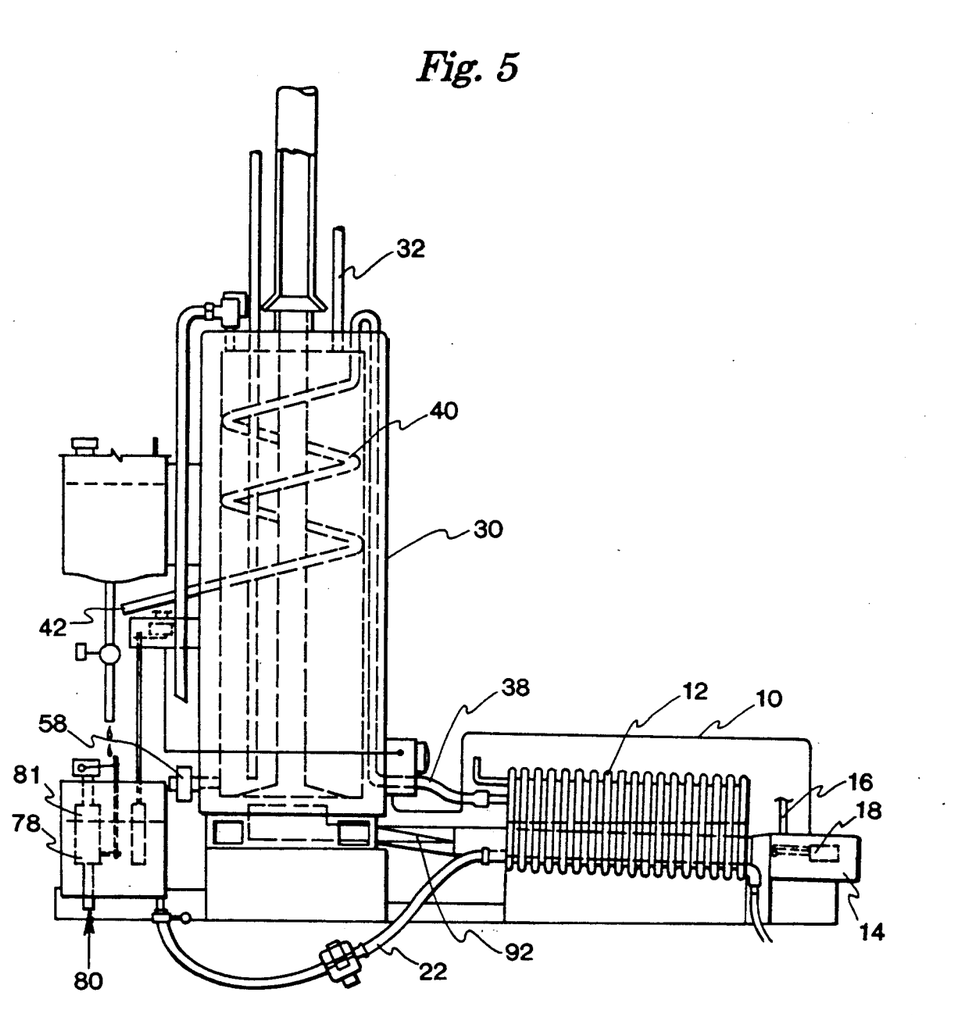
FIG. 5 shows an integrated system according to the invention, of the water distiller, water heater and furnace.
Figure 6:
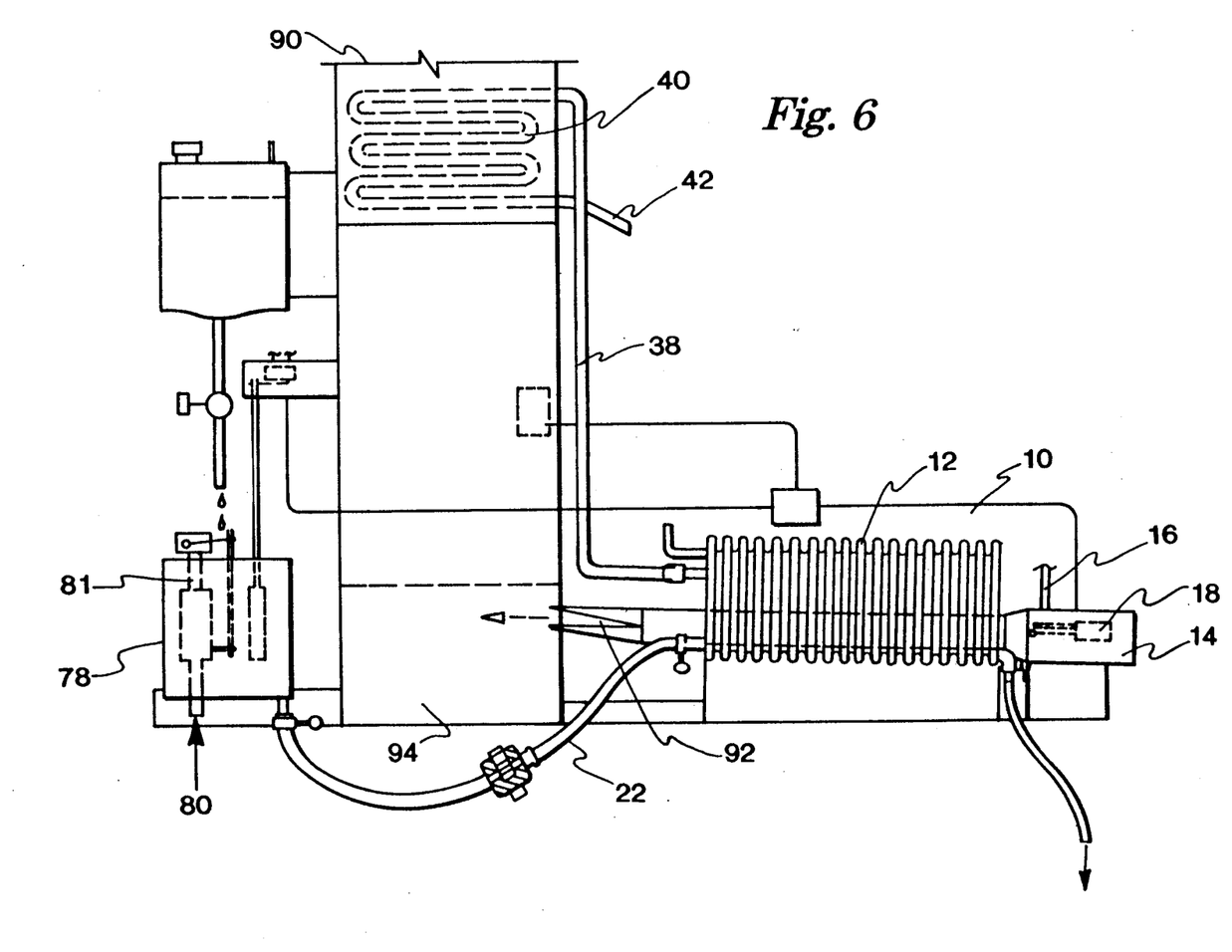
FIG. 6 is another plan view of an integrated water distilling, water heating and space heating system according to this invention.

As shown in FIGS. 1, 2, 3, 5, 6 and 7, the water distiller 10 consists of an elongated water boiler tube 12. Preferably, as illustrated in FIGS. 1, 2, 3, 5, 6 and 7, the tube 12 is a metal corrugated cylinder. In addition, the corrugations serve to add strength to a thin-walled container. The corrugations also add surface area for collection of impurities during operation. In the horizontal boiler, as illustrated in FIG. 6, the corrugations further serve to separate and collect volatile gases, which are then forwarded to the vent provided in the upper end of the vessel above the steam outlet. A gas flame heating element 14 heats the water in the tube 12, as shown in FIGS. 1, 2, 3, 5, 6 and 7. Gas for the gas heating member 14 is supplied through supply line 16 and is ignited by ignitor.

Figure 7:
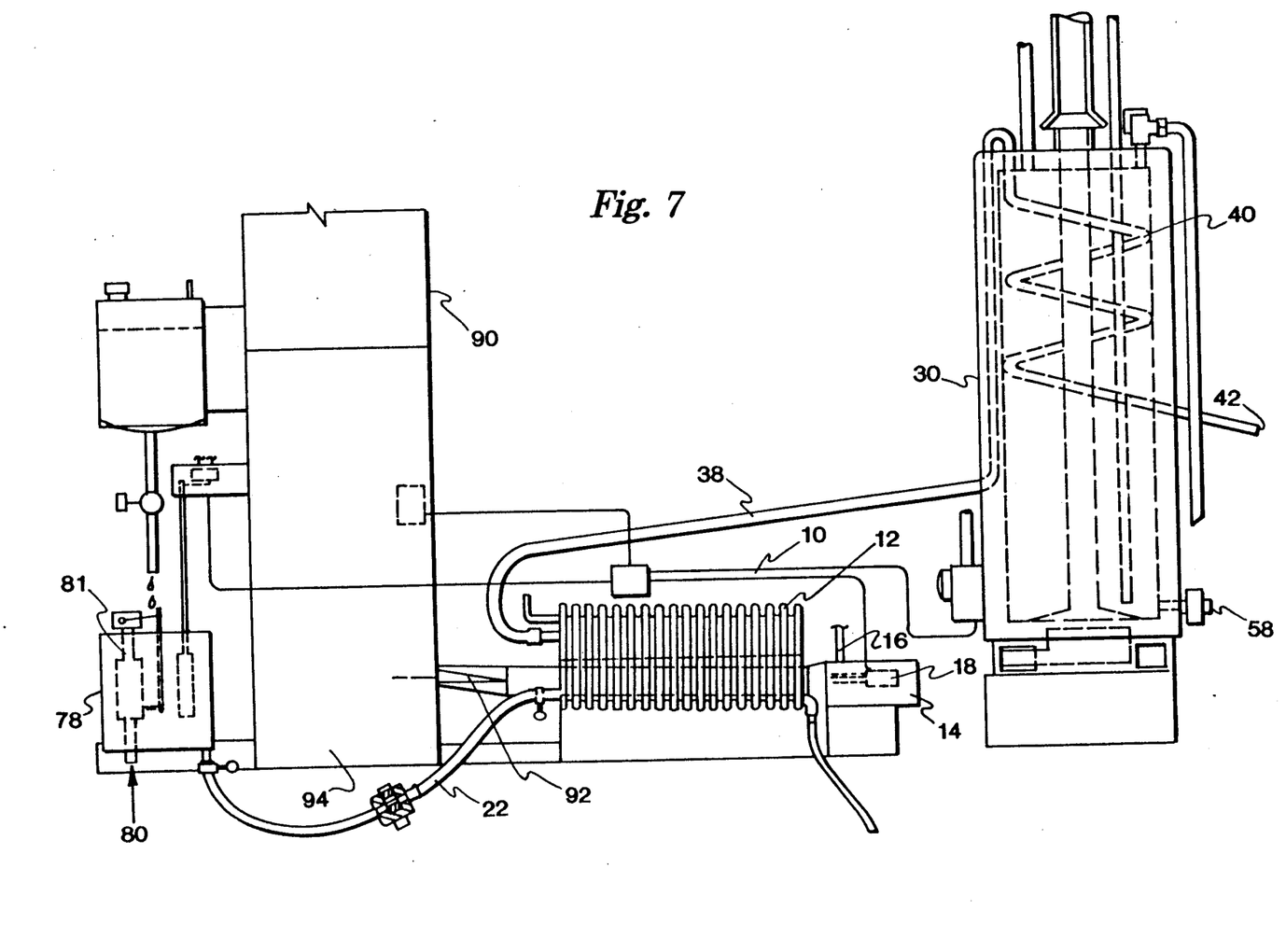
FIG. 7 is a schematic plan view of a conventional existing separate furnace and water heater retrofitted and interconnected by a water distiller, according to the principles of this invention.

Water is supplied to the interior of the tube 12 from a water supply line 22. As illustrated in FIGS. 5, 6 and 7, water is supplied to boiler tube 12 from a holding tank 78 which is in turn connected to line 22. The holding tank 78 is supplied from building water lines. A water level control, similar to the ball cock used in water closets, automatically maintains the level of water in the holding tank 78 and the tube 12 at the same required level. If desired, the water in the holding tank 78 may be further purified by filtering to remove particulate sediment and pretreated with a small amount of hydrogen peroxide sufficient to remove organic impurities.

Disposed within the tube 12 in intimate contact with the water therein is a reticulated filamentous metal heat conducting member, such as a mass of stainless steel wool, a tightly rolled stainless steel screen, a plurality of stainless steel circular disks, or the like or a combination thereof, as described in my U.S. Pat. No. 4,113,571. The heat conducting member functions to receive lime deposits and to minimize the collection of same on the walls of the boiler tube 12. Also, the heat conducting member reduces the turbulence of the boiling water in the boiler tube 12 and helps to separate the inert gasses from the water vapor as well as to help transfer heat rapidly from the heating element to the water.

Figure 1:
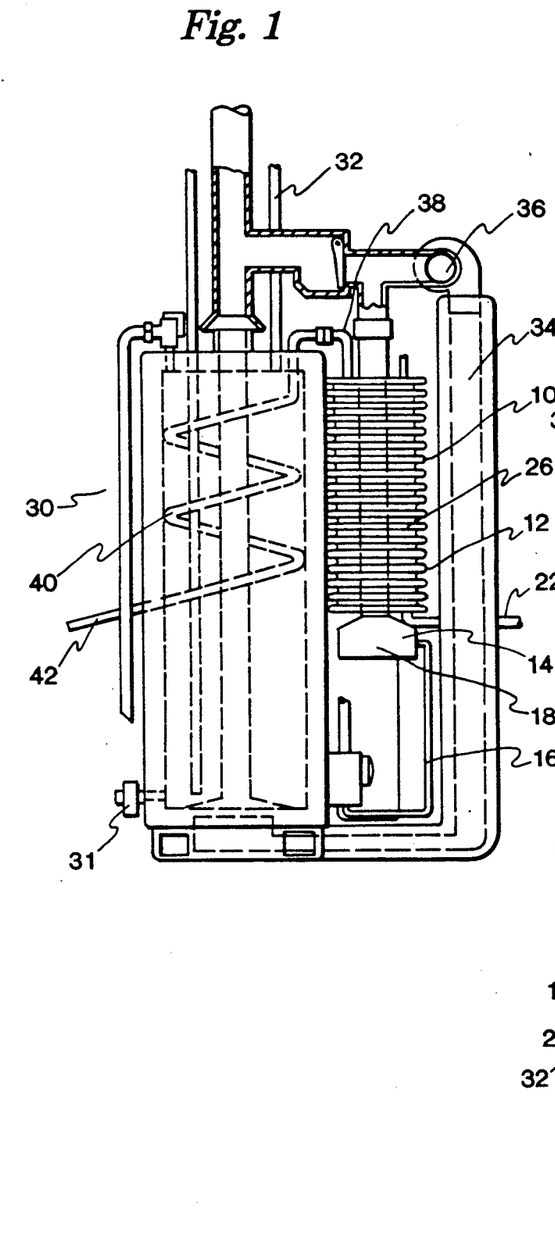
FIG. 1 shows an integrated hot water heater and water distiller system according to the invention.

Referring now to FIG. 1, there is shown one embodiment of an integrated water heater and water distiller according to my present invention. The water distiller 10, as just previously described, is shown as positioned alongside a water heater 30. Note that the gas heating element 14 functions as the source of heat for the boiler tube 12. Exhaust blower fan 36 conducts excess hot combustion gases from the gas heating element 14 through air passageway 34 to be recovered by the water in the water heater 30. Heated undistilled water is withdrawn from the water heater 30 through waterline 32 as in typical water heater installations.

As distillation proceeds in the boiler tube 12, the water vapor is conducted through tube 38 to the condensation tube 40 which spirals downward through water heater 30. As the water vapor condenses to distilled water, the heat of condensation through condensation tube 40 serves to further heat the water in the water heater 30. Distilled water drips from the end of the condensing coil 42.

A drain or tap 31 is conventionally provided at the bottom of water heater 30.

Figure 2:
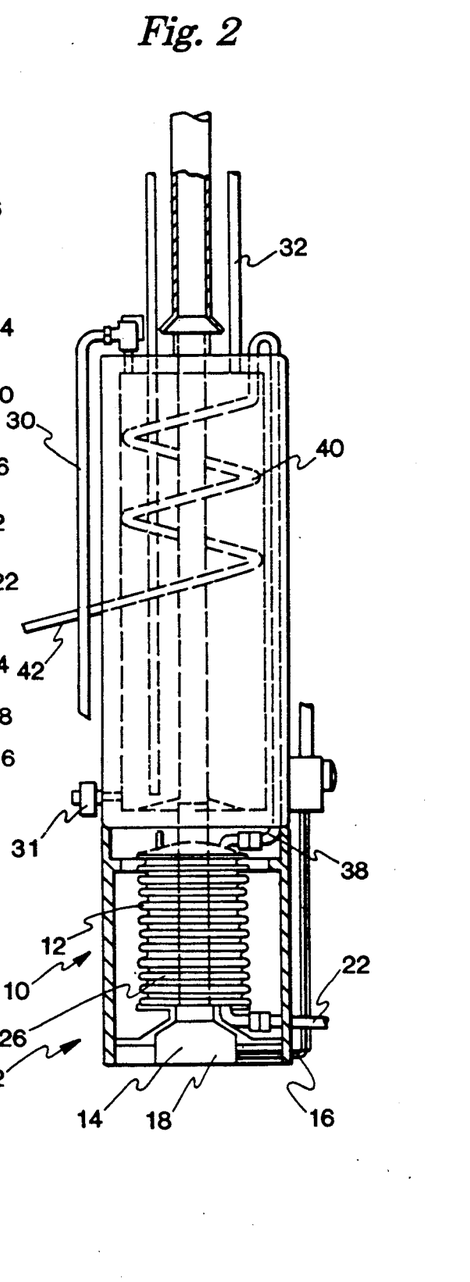
FIG. 2 shows an alternative arrangement of an integrated water distiller and water heater according to this invention.

As shown in FIG. 2, the integrated water heater and water distiller of my present invention may be designed with the water distiller positioned underneath the water heater. Otherwise, the function and design of this integrated system remains the same as just described. Note that the gas heating element 14 functions as the source of heat for both the boiler tube 12 and the water heater 30.

Figure 3:
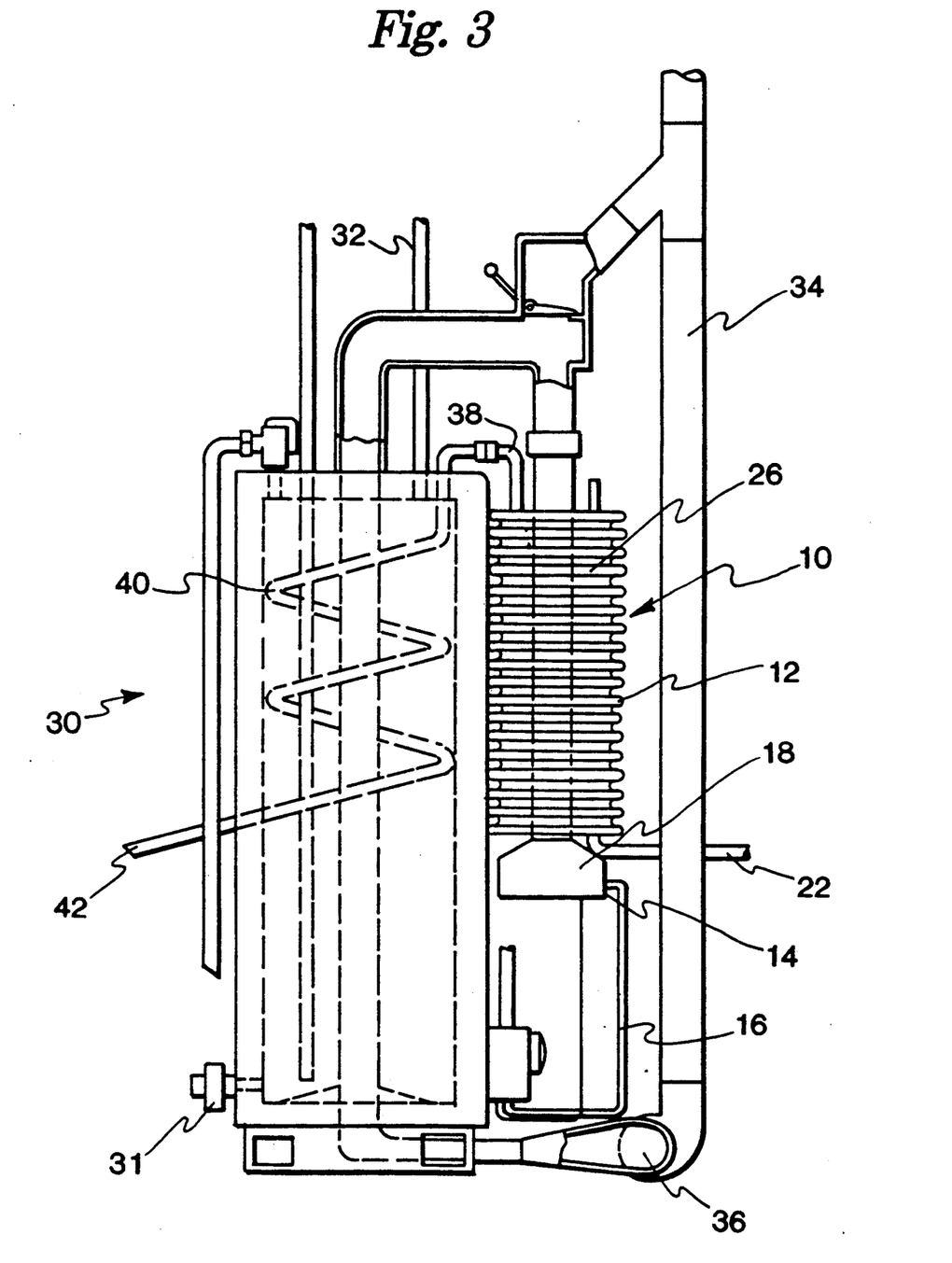
FIG. 3 illustrates another alternative embodiment of my novel integrated water heater and water distiller.

FIG. 3 is a view similar to FIG. 1, but showing the exhaust blower fan 36 positioned in the bottom of the air passageway 34.

Figure 4:
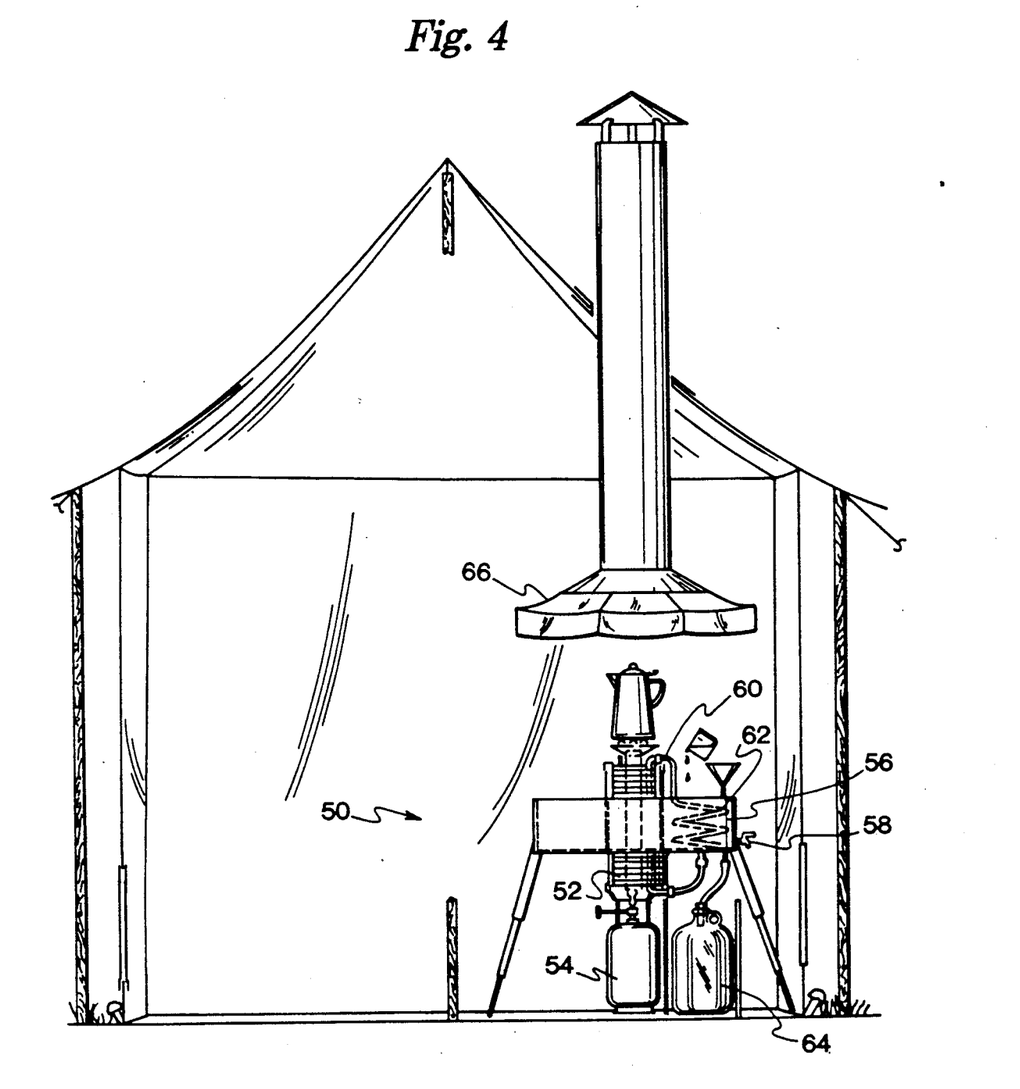
FIG. 4 shows a portable integrated water distilling, water heating and space heating system, using a portable self-contained liquid gas burner.

FIG. 4 shows a portable integrated water distilling, water heating and space heating system, using a portable self-contained liquid gas burner. In the portable system, which is suitable for outdoor use, the water distiller 50 consists of an elongated water boiler tube 52, as previously described herein. The heating element used to heat the water in the boiler 52 can be any conveniently available portable source of heat, such as the liquid propane heater 54 illustrated. The portable system, as shown in FIG. 4, is also suitable for use in tents or temporary structures, especially for military applications and survival gear.

Water is supplied to the interior of the boiler tube 52 from a tank 56 which is preferably of a concentric cylindrical "moat" shape. The water tank 56 may all also desirably be provided with three height adjustable legs evenly placed around the base of the tank for firmly supporting the tank. The water tank 56 must obviously be kept supplied with water to maintain the distillation. The boiler tube 52 is essentially of the same design and construction as described hereinabove for boiler tube 12. As water in the tank 56 is heated, it may be drawn off directly for hot water usage, through hot water tap 58. As distillation proceeds in the boiler tube 52, the water vapor is conducted through tube 60 to the condensation tube 62, which spirals downward through the water tank 56. As the water vapor condenses to distilled water, it is collected in an appropriate receptacle, such as the bottle 64. As illustrated, the flue 66 may be equipped with a canopy on the conical shroud.

FIGS. 6 and 7 show embodiments of the integrated water distiller water heater, and forced air furnace. As shown in FIGS. 6 and 7, the water distiller 10 is of the same design, construction and function as described hereinabove. Also as shown in FIGS. 6 and 7, the distiller may be positioned adjacent the water heater 30 or furnace 90, with the longitudinal axis of the boiler tube 12 positioned at a slight upward angle to the horizontal. This position of the boiler tube 12 provides the advantage of some updraft for the exhaust products.

As shown in FIG. 5, the heating element for the boiler tube 12 is a gas flame heating member 14. Gas for the gas heating member 14 is supplied through supply line 16 and is ignited by ignitor. Conventional gas burners generally commercially available are suitable for adaptation for use according to the present invention. Water is supplied to the interior of the tube 12 from a holding tank 78 connected to a water supply line 80. The water holding tank 78 is supplied with water from water lines 80 through a water level control device 81, such as a ball cock used in water closets to automatically maintain the level of water in the holding tank 78 and the tube 12 at the same required level. As distillation proceeds in the boiler tube 12, the water vapor is conducted through tube 38 to the condensation tube 40, which spirals downward through the water heater 30, to the distilled water outlet 42. The electric circuit also passes through the aquastat to shut off if the water temperature in the water heater or the furnace reaches above a predetermined limit. The water heater and the furnace are of course also equipped with relief valves according to building code and safety requirements.

As shown in FIG. 6, the heating element for the boiler tube 12 is also a gas flame heating member 14, supplied through gas supply line 16 and ignited by ignitor. As shown in FIGS. 5 and 6, the excess hot gases from the gas flame heating member 14 are shot through fire tube 92, which goes through boiler 12, and then into intake plennum or combustion chamber 94 of the furnace 90, which may be of the forced hot air type, hot water heater, or heating boiler. Water is supplied to the boiler tube as described above with reference to FIG. 5. As distillation proceeds in the boiler tube 12, the water vapor is conducted as in FIG. 6, through water vapor tube 38 to the condensation tube 40 which coils through upper area of the furnace 90, to distilled water outlet 42, or as in FIG. 5, through water vapor tube 38 to the condensation tube 40 which coils through the water heater 30 to the distillate outlet 42.

FIG. 7 illustrates an ideal embodiment of this invention suitable for residential installation. Condensation of the distilled water vapor from the boiler tube 12 is carried out in the condensation tube 40 spiraling downward inside the water heater 30. As has been previously explained, no double walling of the condensation tube is necessary, since it contains potable distillate. All of the gas used by the heating element 14, is producing distilled water through the distilled water take off 42, as well as contributing domestic hot water through recovery of the heat of condensation in the water heater 30, and contributing home heating by directing the excess hot gases from the gas flame heating member 14 through fire tube 92, into intake plennum or combustion chamber 94 of the furnace 90. Note that the boiler tube 12 is desirably inclined at a slight angle to the horizontal, as has been previously explained, or the fire tube 92 may be inclined if the boiler is horizontal.

Figure 8:
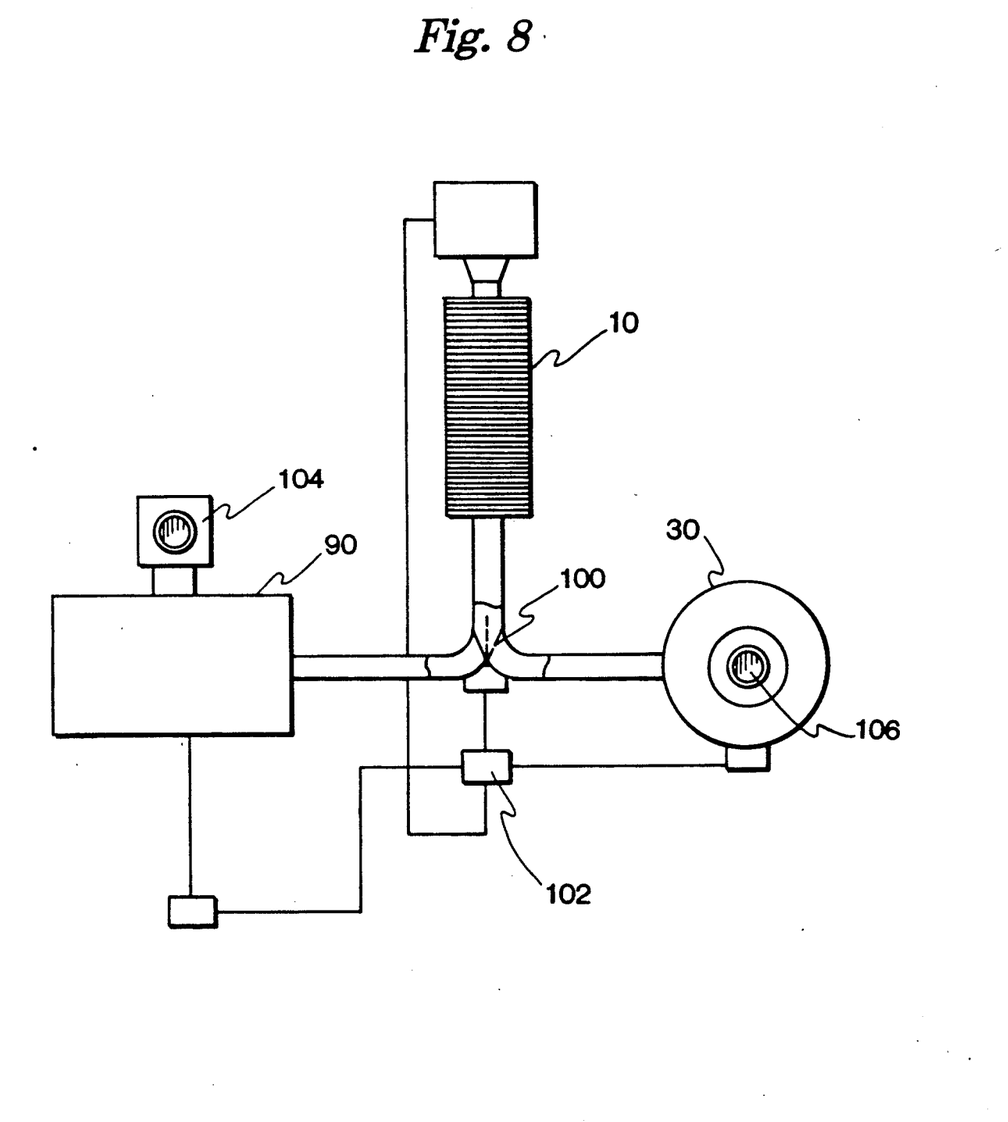
FIG. 8 is an overall schematic drawing of an integrated system, showing a three position flue designator allowing the system to use any single or multiple combination of the water distiller, water heater and furnace.

FIG. 8 shows an overall schematic drawing of an integrated system, showing a three position flue designator 100 allowing the system to use any single or multiple combination of the water distiller 10, water heater 30 and furnace 90.

As clearly shown in FIG. 8, the furnace 90 is equipped with a furnace exhaust flue 104, the water heater 30 is equipped with a water heater exhaust flue 106, and the water distiller 10, water heater 30 and furnace 90 are interconnected with the three-position flue designator 100 by a flue designator/burner control 102. Often, the integrated system as shown in FIG. 8 is a retrofit system utilizing an existing gas fired furnace of the forced air type and an existing gas fired hot water heater, as typically found in many residential and commercial buildings. The three position flue designator 100 is preferably a motorized baffle which allows the designator to be open to the furnace 90, the hot water heater 30 or to both simultaneously. As previously described with reference to FIGS. 5 and 6, the hot combustion gases from the gas flame heating element 14 in the distiller boiler 10 are shot through the fire tube 92 and directed by the flue designator 100 to either the furnace 90, the water heater 30 or both. As has previously herein been described, the hot gases from the fire tube that go through the boiler 10 are conducted into the respective fire chambers so that all available heat can be recovered before exiting to the chimney. It should be noted that it is desirable to remove or otherwise disconnect the original burners in the water heater and/or the furnace in order to prevent the possibility of explosion. Due to the cooling down of the exhaust gases, a draft inducing fan may be needed in the exhaust flue from the furnace or water heater.

An arrangement for backflushing and cleaning the corrugated water boiler tube 12 of the water distiller 10 of this invention is described as follows. The preferred procedure for the back washing system for peak efficiency will be determined in each water quality situation by monitoring the quality of the water produced. In addition, break apart boilers may be used to allow for visual inspection.

Different procedures may be determined depending on the kind of water to be distilled. Generally, the process is as follows:

1. Circulate strong alkaline solution through the boiler by means of circulating pumps with relatively strong force.
2. After drain off of alkaline solution, flush the boiler with water. The circulation procedure described in step 1 can be used after the first flush of the alkaline residue has been drained off.
3. After drainage of the water wash of step 2, a strong acidic solution, such as strong vinegar is circulated through the boiler as described in step 1.
4. After drainage of the acidic solution of step 3, the boiler is water flushed until clear as in step 2.

The alkaline wash removes fats and organic wastes. The acidic wash removes solid debris. The amount of water required in the back-flush cleaning procedure is very small in comparison to the volume of distilled water produced between each cleaning cycle, because the same water is pumped in a closed circuit with sediment filters in line.

Having thus described my invention with reference to the illustrations of the attached figures, the invention in which I claim a proprietary interest is as follows.

What is claimed is:

1. A system selected from the group consisting of a water distiller in combination with a water heater, a water distiller in combination with a forced air furnace and a water distiller in combination with a water heater and a forced air furnace, wherein:

the water distiller comprises an elongated water boiler tube, a gas heating member operatively arranged and connected for directly heating water in said tube, means for connecting the heating member to a source of gas for powering said heating member, an elongated passageway extending lengthwise through the tube for conducting hot combustion gases from the heating member upwardly through the tube, a metal heat transmitter in intimate contact with the water within the tube to transfer heat rapidly from the heating member and the combustion gases to the surrounding water and to minimize water turbulence as distillation proceeds, means for introducing water into the tube to maintain a supply thereof therewithin around the heat transmitter as distillation proceeds, fluid flow conducting means connected with the boiler tube for receiving distilled hot water vapor therefrom; and wherein the forced air heating furnace comprises fluid flow conducting means in direct fluid flow communication with the fluid flow conducting means of the distiller for receiving hot water vapor from the distiller, means for recovering heat of condensation as the water vapor condenses and means for conducting recovered heat to an enclosed space to be heated, and means connected with the fluid flow conducting means of the furnace for receiving water vapor condensate therefrom as distilled water; and wherein the water heater comprises a water heater tank, fluid flow conducting means in fluid flow communication with the fluid flow conducting means of the distiller for receiving hot water vapor from the distiller and conducting the hot water vapor through a single-walled condensing coil within water in the water heater tank, such that the hot water vapor is maintained separately from the water in the water heater tank and heat of condensation is recovered by the water in the water heater tank as the water vapor condenses, and means connected with the fluid flow means of the condensing coil for receiving water vapor condensate therefrom as distilled water.

2. The system according to claim 1, comprising a water distiller in combination with a water heater, and wherein the water heater additionally comprises a fluid tight passageway extending through the water heater tank, means for receiving excess hot combustion gases from the boiler passageway and conducting said gases in fluid flow communication through the water heater tank passageway, such that said hot gases are maintained separately from the water in the water heater tank and excess heat is recovered from said hot gases by the water in the water heater tank.

3. The system according to claim 2, wherein the boiler tube is a corrugated metal cylinder enclosing the metal heat transmitter.

4. The system according to claim 2, wherein the means for introducing water into the tube is operatively arranged and connected to maintain the water within the tube at a desired level.

5. The system according to claim 2, wherein the means for receiving excess hot combustion gases from the boiler passageway and conducting said gases in fluid flow communication through the water heater tank passageway further comprises a blower to conduct the excess hot combustion gases through the water heater tank passageway.

6. The system according to claim 2, wherein the water heater is positioned on top of the distiller with the boiler passageway aligned with the water heater tank passageway.

7. The system according to claim 2, wherein the water distiller is positioned with its longitudinal axis at a slight angle to the horizontal and the water heater is positioned with its longitudinal axis vertical to facilitate introduction of hot combustion gases from the boiler passageway into the water heater tank passageway.

8. A portable system according to claim 2, wherein the boiler tube is operatively arranged and positioned within and surrounded by the passageway of the water heater tank.

9. The system of claim 1, comprising a water distiller in combination with a forced air furnace and wherein the furnace additionally comprises means for recovering and collecting heat of condensation from condensing water vapor, and wherein the furnace additionally comprises means for receiving excess hot combustion gases from the passageway of the boiler in fluid flow communication therewith, means for recovering excess heat from the combustion gases and means for conducting recovered heat to an enclosed space to be heated.

10. The system according to claim 9, wherein the means for introducing water into the tube is operatively arranged and connected to maintain the water within the tube at a desired level.

11. The system of claim 9, wherein the water distiller is positioned with its longitudinal axis at a slight angle to the horizontal and the furnace is positioned with its longitudinal axis vertical, to facilitate introduction of the hot combustion gases from the boiler passageway into the furnace.

12. The system of claim 1, comprising a water distiller in combination with a water heater and a forced air furnace, wherein the water heater recovers heat of condensation from condensing water vapor and the furnace recovers excess heat from hot combustion gases.

13. The system according to claim 12, wherein the means for introducing water into the tube is operatively arranged and connected to maintain the water within the tube at a desired level.

14. The system of claim 12, wherein the water distiller is positioned with its longitudinal axis at a slight angle to the horizontal and the water heater and the furnace are positioned with their longitudinal axes vertical, to facilitate introduction of the hot combustion gases from the boiler passageway into the furnace.

15. A system selected from the group consisting of a water distiller in combination with a water heater, a water distiller in combination with a forced air furnace and a water distiller in combination with a water heater and a forced air furnace, wherein:

the water distiller comprises an elongated water boiler tube adapted to contain water therein, a gas heating element operatively arranged and connected for heating water in the tube, means carried by the heating element for connecting the heating element with a source of gas therefor, metal heat conducting and dispersing means in contact with the boiler tube and the water therein for readily transmitting heat from the heating element to the water in the tube for heating the water to distillation while minimizing water turbulence, means for introducing water into the tube to maintain a water supply within the tube as distillation proceeds, and means connected with the boiler tube for collecting water vapor therefrom; and wherein the water heater comprises a water heater tank adapted to contain water therein, single-walled water vapor conducting means connected with the water distiller for recovering heat of condensation by water in the water heater tank as the water vapor condenses to distilled water; and wherein the forced air furnace comprises means connected with the water distiller for recovering heat of condensation as the water vapor condenses to distilled water and conducting heat of condensation to an enclosed space to be heated.

16. The system of claim 12, additionally comprising a three way baffle operatively interposed among the water distiller, the water heater and the forced air furnace to direct excess hot combustion gases from the water distiller to either the water heater or the furnace or to both, respectively.

17. The system according to claim 12, wherein the boiler tube of the water distiller is positioned with its longitudinal axis at a slight angle to the horizontal and the water heater is positioned with its longitudinal axis vertical to facilitate introduction of hot combustion gases from the boiler passageway into the tank passageway.

18. The system according to claim 3, wherein the corrugations of the boiler tube serve as collision members in conjunction with the reticulated metal heat transmitter during cleaning of the boiler tube for effective removal of accumulated sediment and debris.

19. The system according to claim 12, wherein the water heater additionally comprises a fluid tight passageway extending through the water heater tank, means for receiving excess hot combustion gases from the boiler passageway and conducting said gases in fluid flow communication through the water heater tank passageway, such that said hot gases are maintained separately from the water in the water heater tank and excess heat is recovered from said hot gases by the water in the water heater tank; and wherein the forced air furnace additionally comprises means for receiving excess hot combustion gases from the passageway of the boiler in fluid flow communication therewith, means for recovering excess heat from the combustion gases and means for conducting recovered heat to an enclosed space to be heated.

20. The system according to claim 15, comprising a water distiller in combination with a water heater, wherein the water heater additionally comprises a fluid tight passageway extending through the water heater tank, means for receiving excess hot combustion gases from the boiler heat conducting and dispersing means and conducting said gases in fluid flow communication through the water heater tank passageway, such that said hot gases are maintained separately from the water in the water heater tank and excess heat is recovered from said hot gases by the water in the water heater tank.

21. The system according to claim 15, comprising a water distiller in combination with a forced air furnace, wherein the forced air furnace additionally comprises means for receiving excess hot combustion gases from the passageway of the boiler in fluid flow communication therewith, means for recovering excess heat from the combustion gases and means for conducting recovered heat to an enclosed space to be heated.

22. The system according to claim 15, comprising a water distiller in combination with a water heater and a forced air furnace, wherein the water heater additionally comprises a fluid tight passageway extending through the water heater tank, means for receiving excess hot combustion gases from the boiler heat conducting and dispersing means and conducting said gases in fluid flow communication through the water heater tank passageway, such that said hot gases are maintained separately from the water in the water heater tank and excess heat is recovered from said hot gases by the water in the water heater tank; and wherein the forced air furnace additionally comprises means for receiving excess hot combustion gases from the passageway of the boiler in fluid flow communication therewith, means for recovering excess heat from the combustion gases and means for conducting recovered heat to an enclosed space to be heated.

23. A portable system comprising a water distiller in combination with a water heater, wherein
the water distiller comprises an elongated water boiler tube, a gas heating member operatively arranged and connected for heating water in said tube, means for connecting the heating member to a source of gas for powering said heating member, an elongated passageway extending lengthwise through the tube for conducting hot combustion gases from the heating member upwardly through the tube, a metal heat transmitter in intimate contact with the water within the tube to transfer heat rapidly from the heating member to the surrounding water and to minimize water turbulence as distillation proceeds, means for withdrawing hot water vapor from the boiler tube, fluid flow conducting means connected with the boiler tube for receiving distilled hot water vapor therefrom; and wherein
the water heater comprises a water heater tank, fluid flow conducting means in fluid flow communication with the fluid flow conducting means of the distiller for receiving hot water vapor from the boiler tube and conducting the hot water vapor through a single-walled condensing coil within water in the water heater tank, such that the hot water vapor is maintained separately from the water in the water heater tank and heat of condensation is recovered by the water in the water heater tank as the water vapor condenses, and means connected with the fluid flow means of the condensing coil for receiving water vapor condensate therefrom as distilled water.

24. A system according to claim 23, wherein the tank water recovers heat of condensation from condensing water vapor and excess heat from hot combustion gases.

25. A system according to claim 24, wherein the boiler tube is adapted to be positioned within and surrounded by the passageway of the water tank.

* * * * *